Patented Sept. 16, 1952

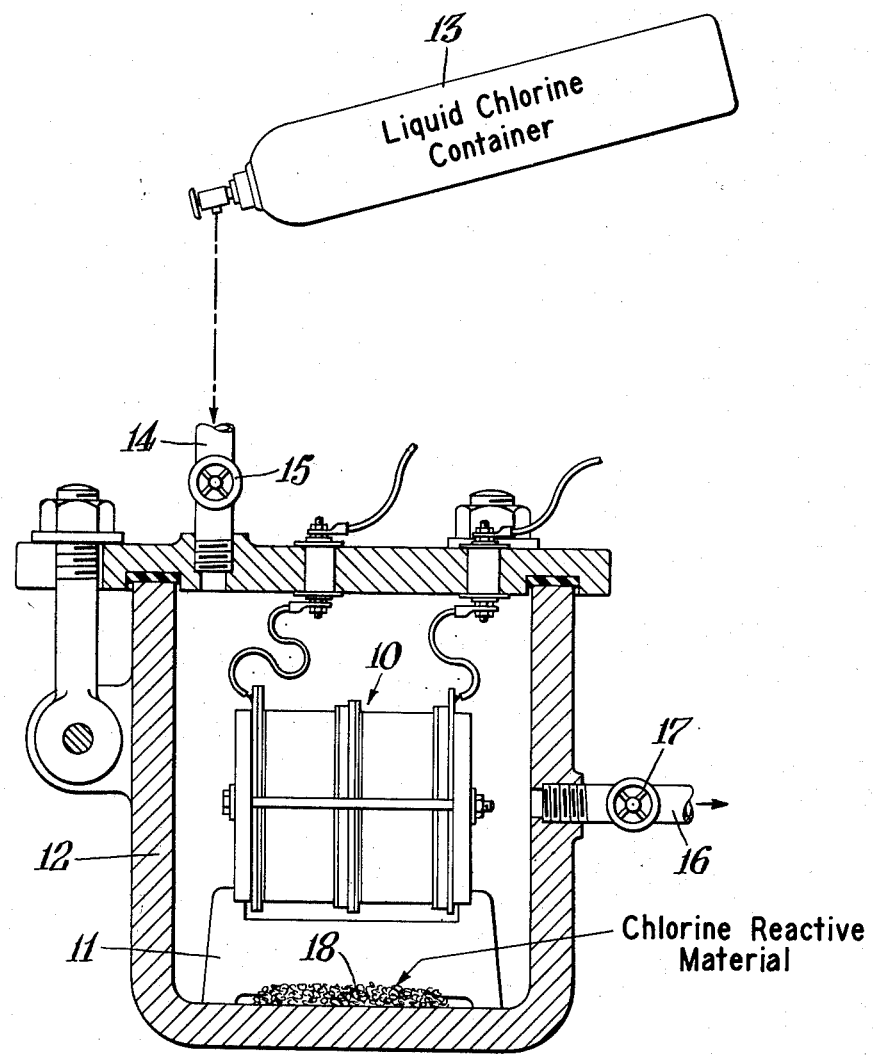

2,610,985

UNITED STATES PATENT OFFICE 2,610,985

ACCELERATION OF VAPORIZATION OF CHLORINE IN A BATTERY

Erwin A. Schumacher, Cleveland, Ohio, assignor, by mesne assignments, to Union Carbide and Carbon Corporation, a corporation of New York Application January 12, 1949, Serial No. 70,591

15 Claims. (Cl. 136—86)

This invention relates to the activation of a chlorine depolarized battery of primary cells and has for an object to expedite the activation of such a battery. Another object is to rapidly vaporize liquefied chlorine making it available to be taken up by the battery cells. Still another object is to provide heat for vaporizing chlorine without having objectionable reaction products formed which are dangerous and injurious to operation of the battery.

It is known to make deferred action primary cells in which all of the electrochemical elements other than the depolarizer are assembled in a container or casing, and to activate the cells for use by introducing the depolarizer into the container. Some cells of this prior art kind are activated by gaseous chlorine, the chlorine being stored, during the inactive period of the cell, adjacent to the cell container.

Chlorine is best stored as liquid since in this form it has small volume and is easily transported in steel cylinders. However, for activation of the chlorine depolarized battery it is essential to vaporize the liquid chlorine. Where extremely rapid activation of the battery is needed, heat is necessary within the battery casing to effect a rapid change of liquid chlorine into gaseous form. If heat from combustion of some carbonaceous fuel is used, the products of combustion are objectionable; moreover, such heating means may be slow, or difficult to control.

The heat of reaction obtained in the formation of the chlorides of a number of metals upon exposure to chlorine has been found adequate to carry on the vaporization of the chlorine after the reaction has started.

According to this invention, it has been discovered that satisfactory speed in activation of the battery is obtained by bringing liquid chlorine into contact with a foil or filament of a metal having a high heat of reaction with chlorine, as, for example, aluminum, magnesium, tin, or zinc, coated with an adhesive which preferably also reacts with the chlorine to produce heat, such as a rubber cement, on which adhesive is a powdered metal which is reactive with chlorine. The powdered metal on the adhesive should be finely divided but need not have a high heat of reaction: copper is satisfactory, for instance.

A suitable reaction mass comprises a thin foundation metal of aluminum foil or wire coated with a reactive rubber adhesive and dusted while moist with antimony or copper powder. In place of the aluminum, zinc or magnesium can be used in thin sheets or strips or wire secured. A reactive bonding medium such as turpentine having incorporated therein small quantities of unsaturated oils, for example, linseed oil may be used as the adhesive. The reaction material preferably is placed adjacent the outlet of the liquid chlorine storage cylinders, but part of it may also be placed under the battery to assist in vaporizing the liquid as it flows under the battery.

The single figure of the drawing illustrates a chlorine activated battery having improved chlorine reactive material on the bottom of the casing below the battery.

The battery 10 illustrated is of the chlorine depolarized type shown in the prior application of Zimmerman et al., Serial No. 53,174, filed October 7, 1948, now U. S. Patent 2,572,296 for "Primary Cell and Battery and Method of Making Same." This battery is mounted on a support 11 in an enclosing casing 12. Liquid chlorine from a supply cylinder 13 or other appropriate source of supply enters the casing through inlet pipe 14 controlled by a valve 15. A pipe 16 with its control valve 17 leads to a vacuum pump in order that any inert gas within the casing during its pre-activation life may be withdrawn before allowing the activating chlorine to enter. On admission of the activating chlorine in liquid form, it falls by gravity to the bottom of the casing where it contacts the reaction material 18 in foil or filamentary form located under the battery for producing the requisite heat to vaporize the chlorine rapidly.

The reaction material includes a foundation metal in foil or filamentary form which is reactive with chlorine to evolve the heat needed for vaporizing the chlorine for activation of the battery. Upon the foundation is a chlorine reactive adhesive with chlorine reactive metal powdered particles anchored to the surface of the foil or filament by the adhesive. The metal chloride reaction products are probably deposited on the inner surface of the enclosing casing where they are harmless to satisfactory operation of the battery. Further details of the reactive material follow, Specifically, one part by weight of aluminum filaments is coated with 0.1 to 0.2 part rubber deposited from a benzene solution and then dusted while moist with two parts of finely divided antimony powder. With the proportions given, the adhesive coating is not substantially thicker than the filament and is usually as thin or thinner. A handbook gives the heat of formation of ferric chloride as 96.30 kilogram calories per gram formula weight, and the heat of reaction of chlorine with aluminum, zinc, tin, and magnesium as being greater than this amount. The Metals Handbook defines "foil" as being not more than about .005 inch thick. Part of the foil so treated and coated is located near the outlet from the liquid chlorine containers and part is arranged longitudinally between the battery and its casing.

Among the advantages of this invention may be mentioned that the materials mentioned are stable under storage conditions, retain their sensitivity to chlorine, and have no deleterious effect on the battery. The conversion products do not affect the battery adversely.

What is claimed is:

1. A method of vaporizing liquid chlorine which comprises bringing liquid chlorine into contact with a metal chlorine reactive body, said body comprising a foundation metal not more than .005 of an inch thick, said foundation metal being coated with an adhesive which is reactive with chlorine, and finely divided chlorine-reactive metal bound to said foundation by said adhesive, and vaporizing the liquid chlorine rapidly by the heat of reaction of said liquid chlorine with said metal body.

2. A method according to claim 1 in which the foundation metal is filamentary aluminum.

3. A method according to claim 1 in which said adhesive is a rubber cement.

4. A method according to claim 1 in which the foundation metal is selected from the class containing magnesium and zinc.

5. A method according to claim 1 in which the foundation metal is aluminum.

6. A method according to claim 1 in which the foundation metal is tin.

7. A method according to claim 1 in which the foundation metal is iron.

8. An article of manufacture for rapidly vaporizing liquid chlorine comprising a foundation metal having a high heat of reaction with liquid chlorine and in at least one of foil and filamentary form to provide large exposed surfaces, an adhesive which is not substantially thicker than the foundation and is reactive with chlorine, coating at least some of said surfaces, and a finely powdered chlorine reactive metal dusted on said adhesive and secured to said foundation metal surfaces by said adhesive, said adhesive being less in weight than the attached powder, whereby said article of manufacture is adapted to vaporize liquid chlorine more rapidly on contact than would the foundation alone.

9. An article of manufacture according to claim 8 in which said foundation metal is from the class consisting of magnesium and zinc.

10. An article of manufacture according to claim 8 in which said foundation metal is aluminum.

11. An article of manufacture according to claim 8 is which said foundation metal is tin.

12. An article of manufacture according to claim 8 in which said foundation metal is iron.

13. In a chlorine depolarized battery having an enclosing casing surrounding said battery, and means for the supply of liquid chlorine inside of said casing for activating the battery, the combination therewith of the improvement for rapidly vaporizing liquid chlorine within the casing and without the formation of objectionable combustion products such as would result from the oxidation of carbonaceous fuels, said improvement including within the casing and in the path of liquid chlorine thin pieces of foundation metal in at least one of foil and filamentary form having large exposed surfaces, a chlorine reactive adhesive coating said surfaces and finely powdered chlorine reactive metal secured to said surfaces by said adhesive.

14. An article of manufacture for rapidly vaporizing liquid chlorine, comprising a chlorine reactive finely divided metal powder dusted on a chlorine reactive adhesive coating on a foundation, said adhesive coating being thin and a minor fraction of the weight of the attached powder, said foundation being in at least one of foil and filamentary form not more than about .005 inch thick and having a heat of reaction with chlorine of at least as much as 96.36 kilogram calories per gram formula weight, whereby said combination reacts more quickly than does the foundation alone to vaporize liquid chlorine.

15. An article of manufacture for rapidly vaporizing liquid chlorine, comprising a foundation, one part by weight of aluminum filament coated with 0.1 to 0.2 part by weight of rubber adhesive, and the rubber adhesive coated with two parts by weight of finely divided antimony powder.

ERWIN A. SCHUMACHER.

REFERENCES CITED

The following references are of record in the file of this patent:

UNITED STATES PATENTS

| Number | Name | Date |
|---|---|---|
| 629,426 | Coleman | July 25, 1899 |
| 1,717,140 | Brandenberger | June 11, 1929 |
| 2,005,360 | Boggs | June 18, 1935 |
| 2,323,169 | Wagenhals | June 29, 1943 |

OTHER REFERENCES

"A Course in General Chemistry," by McPherson and Henderson, third ed., page 589. Ginn & Co., N. Y., publishers.

J. W. Mellor's "Modern Inorganic Chemistry," single volume ed., January 1935, page 460. Longmans, Green & Co., N. Y., publishers.

J. W. Mellor's "Inorganic and Theoretical Chemistry," 1922 ed., vol. 2, page 92. Longmans, Green & Co., N. Y., publishers.

"Hackh's Chemical Dictionary," third ed., 1944, page 529, by J. Grant. The Blakiston Co., Philadelphia, publishers.